United States Patent [19]

Albert, Jr.

[11] 4,367,967
[45] Jan. 11, 1983

[54] BENDING STRAIN RELIEF WITH BEND RESTRICTING CAPABILITY

[75] Inventor: Frank Albert, Jr., Parma, Ohio

[73] Assignee: Preformed Line Marine, Inc., Cleveland, Ohio

[21] Appl. No.: 269,848

[22] Filed: Jun. 3, 1981

[51] Int. Cl.$^3$ .................. H01R 13/56; F16L 57/00
[52] U.S. Cl. .................. 403/41; 138/110; 174/135; 339/101
[58] Field of Search .................. 174/111, 152 G, 135, 174/136; 339/101, 102 R, 103 R; 285/114, 115; 403/41; 138/110, 174

[56] References Cited

U.S. PATENT DOCUMENTS

| | | | |
|---|---|---|---|
| 2,841,637 | 7/1958 | Moseley et al. | 174/163 R |
| 3,009,129 | 11/1961 | Kirk, Jr. | 339/101 X |
| 3,395,244 | 7/1968 | Koehler | 174/135 |
| 3,497,608 | 2/1970 | Elliott et al. | 174/135 |
| 4,203,004 | 5/1980 | Cox | 174/135 |

FOREIGN PATENT DOCUMENTS

| | | | |
|---|---|---|---|
| 964421 | 5/1957 | Fed. Rep. of Germany | 174/111 |
| 813354 | 5/1959 | United Kingdom | 174/135 |

Primary Examiner—Laramie E. Askin
Attorney, Agent, or Firm—Fay & Sharpe

[57] ABSTRACT

A bending strain relief device in the form of an elongated tubular member having a longitudinal axis and including a plurality of rigid sleeve members positioned one after another along the axis. The sleeve members are connected together only by elastomeric material which deforms and flows elastically during relative angular movement between adjacent sleeve members for imparting curvature to the tubular member. Adjacent sleeve members have cooperating surfaces which interfere with each other to effectively limit the maximum degree of relative angular movement and thereby limit the degree of curvature which can be imparted to the tubular member.

6 Claims, 2 Drawing Figures

BENDING STRAIN RELIEF WITH BEND RESTRICTING CAPABILITY

BACKGROUND OF THE INVENTION

This application relates to the art of strain relief devices and, more particularly, to a bending strain relief for restricting the degree of bend which can be imparted to a flexible member.

The invention is particularly applicable to a bending strain relief device for use with mechanical and electromechanical cable terminations, and will be described with specific reference thereto. However, it will be appreciated by those skilled in the art that the invention has broader applications and can be used in other environments such as with hydraulic or pneumatic hose and the like.

It is known to provide bending strain relief for cable terminations for purposes of limiting the degree of curvature which can be imparted to a cable, conductor or the like at the cable termination. Such strain reliefs are commonly in the form of a tubular member through which the cable termination extends. In most cases, previous bending strain reliefs of this general type perform satisfactorily except that they do not include means for establishing minimum permissible strain radii. That is, they do not restrict the maximum degree of curvature which can be imparted to the cable termination.

It has, therefore, been considered desirable to develop a bending strain relief which would readily accommodate free bending within predetermined limits and would automatically convert to a substantially rigid state when the predetemined limits are reached. The subject invention meets the foregoing needs and others to provide a new and improved small profile bend restrictor which is simple in design, effective in use and adapted to use in a wide variety of environments.

BRIEF DESCRIPTION OF THE INVENTION

The present invention provides a new bending strain relief device comprised of an elongated tubular member having a longitudinal axis and including a plurality of substantially rigid sleeve members positioned one after another along the axis. The sleeve members are connected to one another only by deformable elastomeric material and adjacent sleeve members are angularly movable relative to one another for imparting curvature of the tubular member. During relative angular movement between adjacent sleeve members, the elastomeric material deforms and flows elastically and then acts as a plastic spring for returning the tubular member to its original shape when the bending load is released. Adjacent ones of the sleeve members have cooperating abutment means for limiting the degree of relative angular movment therebetween to thereby effectively limit the degree of curvature which can be imparted to the tubular member.

In one arrangement, adjacent sleeve members have overlapping adjacent end portions of different diameters and provide an annular space therebetween. The annular spaces are substantially filled with elastomeric material and are symmetrical about the tubular member longitudinal axis in its straight or unstressed condition. When the tubular member is bent or stressed, adjacent ones of the sleeve members move angularly relative to one another. This causes the annular spaces to become unsymmetrical about the longitudinal axis as peripheral portions of the sleeve member end portions move toward one another so that the annular spaces become substantially closed over opposite, relatively short, peripheral portions thereof. The interference relationship between the end portions of adjacent sleeve members occurring at some predetermined point during relative angular movement therebetween thus limits the degree of permissible angular movement and thereby controls the maximum degree of curvature which can be imparted to the tubular member.

According to one arrangement, the rigid sleeve members have large and small diameter cylindrical portions of approximately equal axial length. The small diameter portion of one sleeve member is received within the large diameter portion of the adjacent sleeve member. The overlapping length of the sleeve members is substantially less than one half the total length of an individual sleeve member. The large and small diameter portions of each sleeve member intersect at a circumferential shoulder. When adjacent sleeve members are overlapped, the overlapping length is substantially greater than the spacing between the terminal ends of a sleeve member and the shoulders on adjacent sleeve members.

In the preferred arrangement, the sleeve members are substantially encapsulated in the elastomeric material which provides a smooth cylindrical bore through the tubular member. The overlapping end portions of adjacent sleeve members may have circumferentially spaced radially extending holes therethrough with the elastomeric material also extending through such holes.

It is a principal object of the present invention to provide a new and improved bending strain relief device.

It is also an object of the invention to provide such a device which is capable of restricting bending curvature to a predetermined minimum radius.

It is an additional object of the invention to provide an improved bending strain relief which provides free controlled bending within predetermined limits and automatically becomes substantially rigid when the predetermined limits are reached.

Other objects and advantages for the invention will become apparent to those skilled in the art upon a reading and understanding of the following specification.

DESCRIPTION OF PREFERRED EMBODIMENTS

Figure 1:
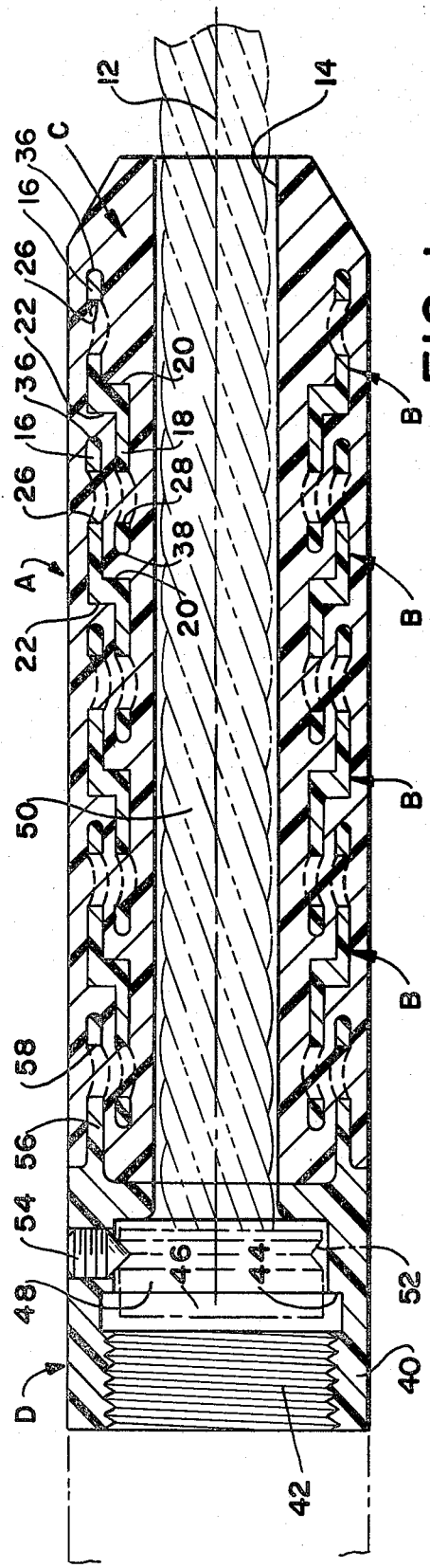
FIG. 1 is a side, cross-sectional elevational view showing one embodiment of a bending strain relief constructed in accordance with the present application.

Referring now to the drawings wherein the showings are for purposes of illustrating preferred embodiments of the invention only and not for purposes of limiting same, FIG. 1 shows a bending strain relief in the form of an elongated substantially cylindrical tubular member A having a longitudinal axis 12 and a central cylindrical passage 14 extending therethrough. Tubular member A includes a plurality of substantially rigid sleeve members B positioned one after another along longitudinal axis 12.

Sleeve members B may be conveniently constructed from metal or a rigid plastic material. Each sleeve member B includes a large diameter cylindrical portion 16 and a small diameter cylindrical portion 18. Large and small diameter portions 16,18 are of approximately equal axial length and are radially offset from one another at inner and outer circumferential shoulders 20,22. Large and small diameter cylindrical portions 16,18 have approximately the same radial wall thickness and are radially offset from one another a distance greater than such radial wall thickness. Each sleeve end portion 16,18 has a plurality of circumferentially spaced radially extending holes 26,28 therethrough and the end portions themselves terminate at circular terminal ends 36,38.

Sleeve members B are positioned with a small diameter portion 18 of one sleeve member received in a large diameter portion 16 of an adjacent sleeve member to provide overlapping adjacent end portions. The axial length of overlap is substantially less than the length of either end portions 16 or 18. Thus, terminal ends 36 are spaced from shoulders 22 and terminal ends 38 are spaced from shoulders 20. The spacing between the terminal ends and the shoulders is substantially less than the axial length of overlap for end portions 16,18. The sleeve members are also positioned with radial holes 26,28 substantially radially aligned with one another. Overlapping end portions 16,18 are radially spaced from one another to define an annular space therebetween which extends both axially and radially of longitudinal axis 12.

Sleeve members B are substantially completely encapsulated within elastomeric material C. In one arrangement, elastomeric material C may comprise urethane plastic which is readily deformable elastically and capable of elastic flow. It will be recognized that many other alternative elastomeric materials could also be used such as, for example, natural or neoprene rubber, polyvinylchloride and the like. Elastomeric material C is bonded to sleeve members B and extends through holes 26,28 as well as filling the annular spaces between overlapping end portions 16,18. The elastomeric material acts to provide a smooth wall for cylindrical through bore 14 and a smooth external surface for the overall tubular member.

One end of tubular member A is provided with connector means which is shown in the form of a fitting D adapted to connect the tubular member to another member. Fitting D may take many different or alternative forms and is shown, by way of example only, as including a cylindrical head portion 40 provided with internal threads 42 for connection with and to another member. An internal shoulder 44 in the head portion cooperates with a flange 46 on an end termination 48 attached to cable 50. Termination 48 may be provided with a circumferential groove 52 for advantageously receiving a pointed end on a setscrew 54 threaded through a suitable radially extending tapped hole in head portion 40. An integral cylindrical flange 56 extending from head portion 40 has substantially the same size and shape as large diameter portions 16 on sleeve members B. Circumferentially spaced holes 58 are provided through flange 56 with the flange being bonded to and encapsulated in elastomeric material C for fixedly interconnecting fitting D and tubular member A. Typical examples of other types of termination devices with which the subject invention may be readily adapted to use are shown in the commonly assigned U.S. Pat. Nos. 3,573,346 and 3,775,811.

Figure 2:
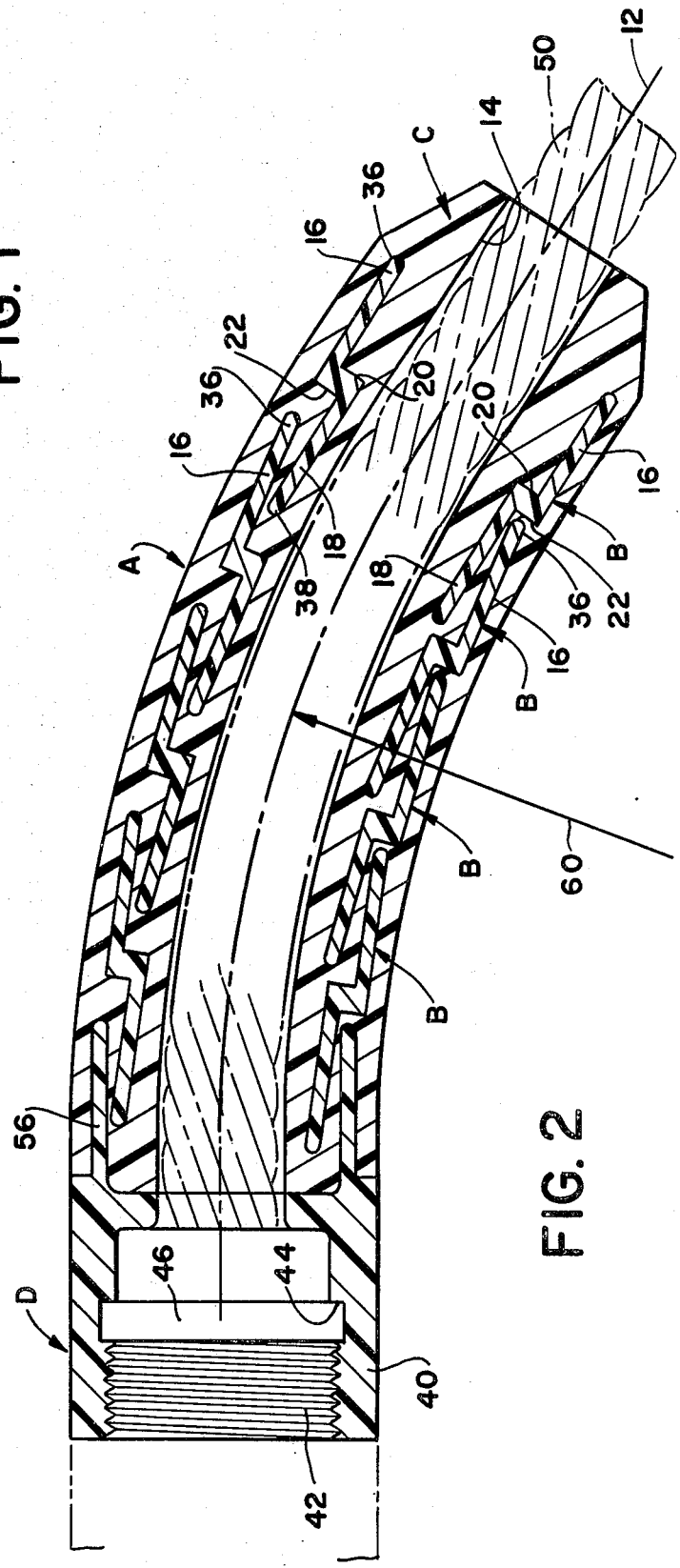
FIG. 2 is a side, cross-sectional elevational view showing another embodiment of a bending strain relief constructed in accordance with the present application, and with the strain relief being under bending stress.

FIG. 2 shows substantially the same bending strain relief as FIG. 1 except for the elimination of holes 26,28 in sleeve members B and holes 58 in fitting flange 56. In view of the fact that the structures are otherwise substantially identical, common reference numerals have been used in both FIGURES for ease of appreciating the invention.

FIG. 2 shows tubular member A being bent to a smooth curvature at a radius generally indicated at 60. Sleeve members B are shown in their positions of maximum inclination relative to one another so that the radius 60 cannot be made or become any smaller. Thus, the maximum degree of curvature which can be imparted to tubular member A is limited to predetermined limits. Up to the predetermined limit, tubular member A is relatively freely bendable; however, upon reaching the predetermined limit, tubular member A automatically becomes stiff and will bend no further. During bending of the tubular member A from the position of FIG. 1 to the position of FIG. 2, adjacent sleeve members B move angularly relative to one another and, during such angular movement, elastomeric material C deforms and flows elastically. Once the bending load is removed, sleeve members B, and entire tubular member A, are automatically returned back to the straight position of FIG. 1. This result is due to the fact that elastomeric material C acts as a plastic spring.

In the straight position of FIG. 1, the annular spaces between overlapping end portions 16,18 are substantially symmetrical about longitudinal axis 12. However, as tubular member A is bent, the annular spaces become unsymmetrical about the longitudinal axis and peripheral portions of the annular spaces at the ends thereof become substantially closed. This occurs because peripheral portions of sleeve member terminal ends 38 move closer to the inside surfaces of adjacent large diameter end portions 16 on one side of longitudinal axis 12 while on the other side axis 12, terminal ends 36 of the sleeve members move closer to an external surface on small diameter end portions 18 of adjacent sleeve members. Thus, relatively short peripheral portions at opposite locations move closer together until the elastomeric material therebetween can be compressed no further to thereby limit the angular movement which can take place between adjacent sleeve members.

In FIG. 2, the peripheral portion of the wall of tubular member A which is located on the inside of curved axis 12 has peripheral portions of end portions 16,18 therein which interfere with one another to limit bending curvature. The opposite or outside peripheral portion of the wall of tubular member A located outside of curved axis 12 also has peripheral portions of end portions 16,18 which interfere with one another to limit bending curvature. The diameters and overlapping lengths of end portions 16,18 are such that relative angular movement between adjacent sleeve members cannot exceed approximately 20°. Accordingly, this limits the bending curvature so that radius 60 cannot be any smaller than that generally shown in FIG. 2.

It will be recognized that sleeve members B may be considered stiffener means encapsulated within elastomeric material C for automatically stiffening tubular member A against further bending when a predetermined bending limit has been reached (FIG. 2). The stiffener means defined by sleeve members B may be considered adjacent annulets which are angularly movable relative to one another for imparting the desired curvature to the tubular member. The peripheral surface portions which move toward one another for limiting relative angular movement may be considered cooperating abutment means. Small spacers of elastomeric material may be positioned in the annular spaces between end portions 16,18 to accommodate assembly of a plurality of the sleeve members for positioning purposes in a cavity of a mold. The sleeve members are subsequently encapsulated within elastomeric material which is injected into the mold cavity. It will be apparent that many other arrangements for holding sleeve members B in a spaced or oriented relationship may also be used including, for example, laterally movable pins in the mold. Although such pins would leave small bores in the exterior surface of elastomeric material C, they would have no harmful effect. It is also possible to bond preformed inner and outer tubes of elastomeric material to the sleeve members. The spaces between such preformed tubes may or may not be filled with additional elastomeric material. Still further arrangements may be advantageously employed as will be known to those skilled in the art.

Although the invention has been shown and described with respect to two embodiments, modifications and alterations will occur to others upon a reading and understanding of this specification. It is intended to include all such modifications and alterations insofar as they come within the scope of the appended claims or the equivalents thereof.

Having thus described the invention, it is now claimed:

1. A bending strain relief comprising:
   an elongated tubular member having a longitudinal axis and including a plurality of substantially rigid identical commonly oriented sleeve members encapsulated within deformable elastomeric material, said sleeve members being positioned one after another along said axis out of engagement with one another and being connected together by said elastomeric material,
   each said sleeve member having opposite large and small diameter cylindrical end portions, said small diameter end portion having an outer cylindrical surface and a circular small diameter terminal end, said large diameter portion having an inner cylindrical surface and a circular large diameter terminal end,
   said sleeve members having said large and small diameter end portions longitudinally overlapping one another in radially-spaced relationship,
   each outer surface having an outward circular portion of a first fixed diameter immediately adjacent its terminal end, and an axially spaced inward circular portion of said first fixed diameter axially spaced inwardly from said outward circular portion,
   each inner surface having an outward circular portion of a second fixed diameter immediately adjacent its terminal end, and radially aligned with said inward circular portion of said outer surface of the overlapping adjacent sleeve member, and an inward circular portion of said second fixed diameter axially spaced inwardly of its terminal end and radially aligned with said outward circular portion of said outer surface of the overlapping adjacent sleeve member;
   abutment means including the relationship between said fixed diameters, the radial spacing between said inner and outer surfaces and the axial spacing between circular portions of respective surfaces that determines the degree of longitudinal overlap between said large and small diameter end portions;
   said abutment means providing and limiting relative angular movement only up to 20°, about a pivot axis perpendicularly intersecting said axis, between two adjacent sleeve members until precluded by first substantial abutment between said outward circular portion of said outer surface of one sleeve and said inward circular portion of said inner surface of the adjacent sleeve and second substantial abutment between said outward circular portion of said inner surface of the adjacent sleeve and said inward circular portion of said outer surface of said one sleeve;
   said first and second substantial abutments being diametrically opposite each other and being spaced a substantial axial distance; and
   said elastomeric material being within said radial spacing so that during said relative angular movement said elastomeric material is elastically deformed and elastically flows away from said first and second abutments and constitutes spring means for biasing said tubular member to reduce any relative angular movement between adjacent sleeve members.

2. The bending strain relief as defined in claim 1 including circumferentially spaced substantially radially extending holes through at least certain of said end portions on each said sleeve member, said holes being filled by said elastomeric material.

3. The bending strain relief as defined in claim 1 wherein each said end portion on each said sleeve member includes a plurality of circumferentially spaced radially extending holes therethrough with said holes being filled by said elastomeric material.

4. The bending strain relief as defined in claim 1 wherein said elastomeric material provides a substantially smooth cylindrical bore through said tubular member.

5. The bending strain relief as defined in claim 1 including connector means on one end of said tubular member for connecting same to another member, said connector means having flange means cooperating with one of said end portions on an adjacent sleeve member in substantially the same manner as the cooperation between large and small diameter end portions on adjacent sleeve members to provide limited relative angular movement between said flange means and the adjacent sleeve member in substantially the same manner and to the same degree as between adjacent sleeve members.

6. The bending strain relief as defined in claim 5, said connector means including flange means dimensioned and positioned for cooperation with an adjacent sleeve member to limit relative angular movement between said flange means and said adjacent sleeve member to not greater than approximately 20°.

* * * * *

UNITED STATES PATENT AND TRADEMARK OFFICE
CERTIFICATE OF CORRECTION

PATENT NO. : 4,367,967
DATED : January 11, 1983
INVENTOR(S) : Frank Albert, Jr.

It is certified that error appears in the above—identified patent and that said Letters Patent is hereby corrected as shown below:

On Title Page, under "Assignee" heading, please change "Preformed Line Marine, Inc." to read --Preformed Marine, Inc.--.

*Signed and Sealed this*

*Tenth* Day of *May 1983*

[SEAL]

*Attest:*

*Attesting Officer*

GERALD J. MOSSINGHOFF

*Commissioner of Patents and Trademarks*